March 24, 1959
R. T. BAYARD
2,879,423
COUNTER
Filed June 2, 1954
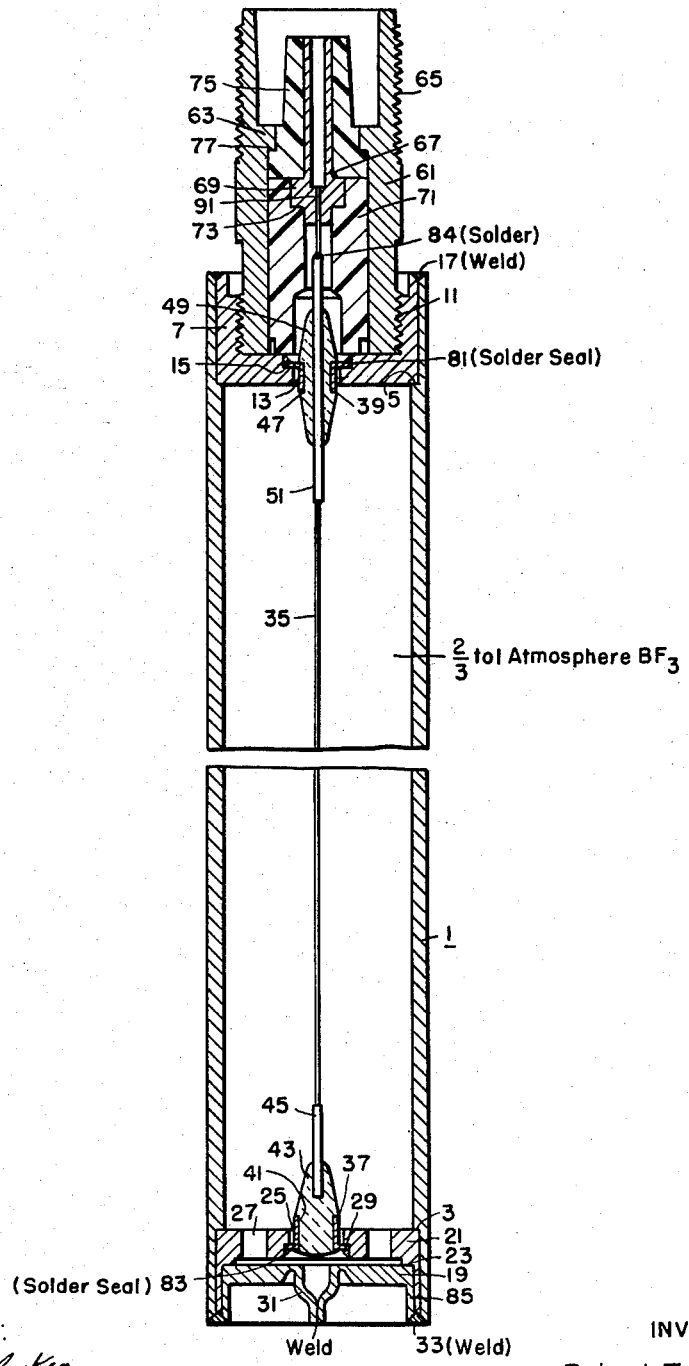
WITNESSES:
E. A. McCloskey
Leon M. Garman
INVENTOR
Robert T. Bayard.
BY
Hymen Diamond
ATTORNEY United States Patent Office 2,879,423
Patented Mar. 24, 1959

2,879,423

COUNTER

Robert T. Bayard, Pittsburgh, Pa., assignor to Westinghouse Electric Corporation, East Pittsburgh, Pa., a corporation of Pennsylvania Application June 2, 1954, Serial No. 434,051

10 Claims. (Cl. 313—93)

My invention relates to radiation sensitive apparatus and has particular relation to detectors for thermal or slow neutrons.

This application relates to and incorporates by reference an application Serial No. 380,964 filed September 18, 1953 by William Baer, Robert T. Bayard, and Oliver T. Swift for "Fission Counter" now Patent No. 2,809,313. To the extent that this Baer-Bayard-Swift application discloses any subject matter of which I alone am the inventor, the present application is a continuation-in-part of the Baer-Bayard-Swift application.

The Baer-Bayard-Swift application is directed to a neutron counter which measures the neutron intensity or neutron flux density produced in the vicinity of apparatus which operates with fissionable materials. The neutron intensity involved is relatively high and the Baer-Bayard-Swift counter has proved entirely suitable for this purpose. But for many purposes, a more sensitive detector of neutron flux density is required, and for this purpose, a neutron detector of the type to which my present invention in its specific aspects relates is used. The neutron detector of this type is called a proportional counter because the intensity of the discharge which results from an ionizing event is proportional to the amount of initial ionization.

The proportional counter comprises a gas-tight container having within it a gas, such as boron trifluoride ($BF_3$), and means for impressing a potential on electrodes within the container to produce ionization when neutrons impinge on the gas within the container. In the case of boron trifluoride, neutrons interact with the boron nuclei of the boron trifluoride gas producing nuclear disintegration which results in lithium nuclei and alpha particles. These fragments of the boron are highly energetic and cause the boron trifluoride gas to be ionized and a discharge to be produced. The discharge current may be transmitted through an external circuit to indicate the presence of the neutrons.

Proportional counters constructed in accordance with the teachings of the prior art are not usable at high temperatures and it is an object of my invention to provide a proportional counter which is usable in such applications and which can measure the neutron flux near apparatus which operates at high temperatures.

I have found that an important requirement of proportional counters usable at high temperatures is that their containers must be permanently sealed off; they cannot be closed gas tight by gaskets of neoprene or the like because the latter would deteriorate and leak at high temperatures and because the boron trifluoride would react with the gasket material and destroy the necessary multiplication properties of the gas.

It is contemplated that the counter according to my invention will be used to measure low neutron flux in regions in which the neutron flux is low during measuring intervals and high at other times. Experience with counters of the prior art has led to the conclusion that they became entirely inoperative in such use.

It is, accordingly, broadly an object of my invention to provide a highly sensitive proportional counter for use in regions in which the neutron flux is low while measurements are being made and high at other times.

In the proportional counters of the prior art, the walls of the gas-tight container are soldered together, and to facilitate the soldering, these walls are composed of a material, such as brass.

My invention in its broader aspects arises from the realization that the brass or like material of which the prior art container is composed has a high cross-section to thermal neutrons. Brass and like materials on absorbing the neutrons during the periods between measurements tend to become radioactive and remain radioactive for a long time, thereby injecting stray radiation and particularly gamma rays and beta rays into the gas of the counter which, in turn, results in such a high noise level of the counting apparatus as to entirely block out the signals responsive to the low neutron density during the measuring intervals. In addition, the penetration of neutrons to the boron trifluoride through the brass walls is reduced and the sensitivity is thus materially reduced by the portions of the container which are of brass or similar material.

In accordance with the broader aspects of my invention, I provide a proportional counter, the container of which is composed substantially throughout of aluminum. This container is made up of a number of separable aluminum parts which must be permanently joined gas-tight to eliminate gasketing. In accordance with a specific aspect of my invention, the aluminum parts are welded together, preferably by arc welding with a tungsten electrode in an inert gas atmosphere or in an atmosphere of an inert gas having a small quantity of oxygen therein.

To provide for the impressing of a potential between its electrodes, the proportional counter, in accordance with my invention, has one seal including an insulating component. Such a seal necessarily includes as a component thereof a metal, such as the alloy of cobalt, iron, and nickel, sold under the name Kovar alloy, which cannot readily be welded to the aluminum. This seal is formed by soldering the Kovar alloy to the aluminum over a relatively small area so that the stress to which it is subject and its effect in deteriorating sensitivity is a minimum. Because of the fact that the surface of aluminum is usually oxidized, difficulty is encountered in soldering the Kovar alloy to aluminum in accordance with the teachings of the prior art.

It is, accordingly, a specific object of my invention to provide a method for soldering Kovar alloy to aluminum.

In accordance with this specific aspect of my invention, the aluminum is first heated to the melting temperature of tin, and a puddle of tin is deposited over the surface of the aluminum where the solder joint is to be produced. Thereafter, the oxide under the puddle is scraped away while the puddle is maintained in moltening condition. The Kovar alloy is then soldered to the tinned aluminum surface.

In the making of a proportional counter, as disclosed herein, the container must be evacuated and then filled with a nucleonically reactive gas, such as boron trifluoride. In accordance with the teachings of the prior art, an opening is provided in one of the walls of the container and a tubulation for exhausting and refilling is sealed through the opening. Specifically, the proportional counter is of general cylindrical structure, and the tubulation is, in accordance with the teachings of the prior art, sealed through one of the bases of the cylinder at a point between the center of the cylinder and the periphery of the tube.

Difficulties are encountered with counters of this structure. Since limited space is available between the center of the base and the end of the peripheral wall, the exhaust tube must be relatively small. In addition, the exhaust tube must be pinched off after the exhaust operation at a substantial distance from the base to avoid leaks. Thus, the exhaust tube after being pinched off projects from the end of the counter and may readily be damaged.

It is, accordingly, an object of my invention to provide a novel structure for exhausting a proportional counter.

A more general object of my invention is to provide a novel exhaust tubulation for an electric discharge device.

In accordance with my invention, the exhaust tubulation extends integrally from the center of the end base. This tubulation may be of substantially larger diameter than the corresponding prior art structure. In addition, the problems of welding the tubulation to the base are eliminated. Further, because the tubulation need not be welded to the base and because of its position, the tube may be pinched off very near to the base. Thus, the pinched off tubulation may extend a shorter distance from the base than the flange produced by the seal of the base to the circumferential portion of the counter. The seal is thus protected from being damaged by accidental impact.

A further specific aspect of my invention is the provision of a connector for the counter through which the potential is impressed between its electrodes which shall be of simple and rigid structure. In accordance with my invention, this connector is a component part of the counter. The contact of this connection is a metal tube having a flanged head such that the connector is of generally T-shaped cross section. The contact is supported in a shell by a split cylinder, which may be assembled in the shell after the electrode of the counter is joined to the contact. The shell is threaded so that it may be screwed into one of the bases of the counter. The split cylinder structure permits the connection to be made between the electrode of the counter and the contact before the connector is assembled and, thus, simplifies the construction and assembly of the apparatus.

The novel features that I consider characteristic of my invention are discussed above. The invention, itself, both as to its organization and its method of operation, together with additional objects and advantages thereof will be understood from the following description of a specific embodiment when read in connection with the accompanying drawing, in which:

The single figure is a view in longitudinal section of a proportional counter in accordance with my invention.

The apparatus shown in the drawing includes a hollow tube 1 of generally cylindrical structure which is preferably composed of aluminum. This tube is of somewhat increased internal diameter at each end, and shoulders 3 and 5 are thus provided near each end between the portion of increased diameter and the portion of lesser diameter. At one end, which I will call the upper end because of its position on the drawing, a cup-shaped end cap 7 is provided to close the tube 1. The cap 7 has an outside wall and base dimensioned so that it fits snugly into the increased diameter portion at the upper end and engages the shoulder 5. This end cap includes a section of reduced diameter which has an internal thread 11. The cap 7 has a central opening 13, the boundary of which is provided with a shoulder 15.

The cap 7 is composed of aluminum and is welded to the tube by means of a gas-tight weld 17 extending around the whole periphery of the junction between the cap 7 and the tube 1.

At the other end, which I will call the lower end because of its position on the drawing, the junction between the tube 1 and its closure is of composite structure including the cap 19 and an insulator support 21, both composed of aluminum. The insulator support 21 is of cup shape including a base and walls dimensioned so that it fits snugly into the portion of increased diameter of the tube and engages the shoulder 3. The insulator support 21 has a shoulder 23 near its base and its base has a central opening 25 and a plurality of openings 27 around the central opening. The boundary of the central opening 25 has a shoulder 29. The end cap 19 is also cup shaped and has a base and walls dimensioned so that it can be snugly nested in the insulator support 21 to engage the shoulder 23. From the center of the end cap 19, an exhaust tubulation 31 extends integrally, the end cap being grooved in the region in which the tubulation 31 extends from it. This tubulation can be of substantial diameter. The end cap 19 and insulator support 21 are sealed to the tube 1 by means of a gas-tight weld 33 extending around the whole junction between the end cap 19, insulator support 21 and tube 1.

The tube 1 and its closures 7, 19, 21 constitute the ground electrode of the counter, which is usually electrically negative. The other, or hot, electrode is a wire 35 which is supported between the end cap 7 and the insulator support 21 by a pair of insulator assemblies 37 and 39. One of these assemblies 37 consists of a flanged thimble 41 of an alloy, such as the aforesaid Kovar alloy, which can be readily sealed to glass or other like insulator from one end of which thimble an insulator 43, such as glass for example, of generally cone-shaped form extends. The insulator 43 is sealed to the thimble 41 and a tube 45 of Kovar alloy or the like is sealed through the tip of the insulator 43. The flange of the thimble 41 is soldered to the shoulder 29 of the insulator support 21.

The other insulator assembly 39 includes a flanged thimble 47 similar to the thimble 41 of the first-mentioned assembly, and an insulator 49 having generally conically shaped projections at both ends is sealed to the thimble with the projections extending beyond both ends of the thimble. A tube 51 of Kovar alloy or the like extends through the insulator 49 and is sealed vacuum tight to the projections. The flange of the thimble 47 of the assembly 39 is soldered to the shoulder 15 of the cap 7.

The electrically hot electrode wire 35 extends between the tubes 45 and 51 extending from the insulators 43 and 47. The tube 45 of the lower insulator is pinched so that it holds the end of the wire 35 firmly. The wire 35 extends entirely through the other insulator 49 and is sealed vacuum tight to the end of its tube 51 by means of the solder joint 84, presently to be described.

The counter is provided with a connector which comprises a shell 61 externally threaded at its lower end so that it may be screwed into the thread 11 of the upper end cap 7. The shell 61 is of smaller inside diameter at its lower end and of larger diameter at its upper end and has an inwardly extending projection 63 between the ends. The shell has an external thread 65 along its upper end and is, thus, adapted to engage a correspondingly internally threaded female connector.

The connector has a contact which is a hollow pin 67 having a flanged head 69 at its lower end. The connector also includes a split cylinder 71 of insulating material which may be assembled around the head 69 of the connector. Each half of the split cylinder 71 has an internal shoulder 73 near its upper end, and when the connector is assembled, this shoulder engages the flange of the head 69.

The hollow pin portion of the contact 67 is enclosed in an insulator 75 having a generally conical external surface which has an exterior shoulder 77 engaging the internal projection 63 of the shell 61.

In assembling the proportional counter in accordance with my invention, the upper cap 7 is slipped into the tube 1 and welded to the tube at 17. The flange of the thimble 47 of the associated insulator assembly 39 is then disposed on the shoulder 15 of the cap 7 and soldered to the cap at 81. This joint 81 is gas tight. The wire 35 is next slipped through the tube 45 extending from the other insulator assembly 37 and the tube is pinched to hold the wire. The flange of the thimble 41 of the latter assembly 37 is then engaged with the shoulder 29 of the insulator support 21 and is soldered to this shoulder at 83. The joint 83 must be strong but need not be gas tight. The wire 35 is then slipped through the conductor 51 extending through the insulator assembly 35 soldered to the cap 7.

The insulator support 21 is now slipped into the associated end of the tube so that it engages the shoulder 3 and the cap 19 is slipped into the insulator support so that it engages shoulder 23 and the insulator support, cap and tube are welded (at 33). The wire is then slightly tensioned and the projecting end of the tube 51 extending from the insulator is pinched flat, its tip folded back double and soldered vacuum tight at 84.

The container which is thus formed is now exhausted through the exhaust tubulation 31 in the lower cap 19 and the container filled with boron trifluoride at a pressure of 0.1 to 1 atmosphere. The tubulation 31 is now pinched flat, cut off so that its tip does not extend beyond the flange 85 formed by the lower cap 19, the insulator support 21, and the tube 1, and is welded vacuum tight with the pinch clamp still in place. The clamp is then removed.

The soldered end 84 of the tube 51 of the upper insulating support is then joined by a wire 91 to the contact 67 of the connector. The semi-cylindrical halves of the insulator 71 are then placed together so that they form a complete cylinder, and the contact 67 is placed with its flange 69 engaging the shoulder 73 of the split cylinder 71. The conical insulator 75 is next inserted in the shell 61 with its shoulder 77 engaging the projection 63 and the shell and conical insulator are slipped over the contact and the cylinder 71 below it, and the shell is screwed into the upper end cap 7. The proportional counter is now complete.

The welds 17 and 33 joining the caps 7 and 19 and the tube 1 and the weld closing the exhaust tubulation 31 are produced by arc welding with a tungsten electrode in an inert gas shield. The solder joints 81 and 83 between the Kovar alloy thimble flanges and the aluminum are produced as described above by tinning, scraping the aluminum under the puddle of tin and soldering to the tinned surfaces of the aluminum.

The proportional counter thus produced has a wall composed substantially throughout of aluminum. The only region of the wall which is not composed of aluminum is the small flange of the thimble 47 of the upper insulator assembly 39 which is composed of the Kovar alloy. The area of this thimble is so small that its effect on the sensitivity of the counter is inappreciable. The counter then has a high sensitivity; I have made counters in accordance with my invention having a sensitivity of four counts per unit neutron flux, that is per neutron per centimeter per second.

The counter is substantially leak-proof since its gas-tight seals are for the most part welded. The only soldered seals are the seal between the flange of the thimble 47 of the upper insulator assembly 39 and the seal at the tube 51 of this insulator which extends outward. These seals are of relatively small dimension so that they are not subjected to substantial stresses. The solder joint 83 at the lower insulator is enclosed within the space within the container and need only be mechanically sound.

Because the exhaust tubulation 31 is disposed in the center of the lower cap 19 and is integral therewith, the tubulation 31 may be of large diameter and the structure is strong and simple. The large diameter tubulation enables the counter to be evacuated of undesirable gases more easily. Since the tube 31 is pinched off so that it is within the flange 85 formed by the cap and its associated welded parts, the welded seal of the tubulation is protected.

While I have shown and described certain specific embodiments of my invention, I am fully aware that many modifications thereof are possible. My invention, therefore, is not to be restricted except insofar as is necessitated by the spirit of the prior art.

I claim as my invention:

1. A radiation detector comprising an elongated outer electrode, a closure member for each end of said electrode, said closure members each having an aperture disposed adjacent its center, a pair of opposed flanged thimbles inserted individually in said apertures, the flange of each said thimble being disposed in bearing contact with a portion of the associated one of said closures, an elongated inner electrode, a pair of insulating members supported by and secured to each of said thimbles, respectively, and means for securing said inner electrode to said insulating members adjacent the ends, respectively, of said inner electrode.

2. A radiation detector comprising an elongated tubular outer electrode, a closure for each end of said electrode, an insulating assembly secured to each of said closures and extending into the interior of said tubular electrode, an elongated inner electrode, a deformable tubular element secured to each of said insulating assemblies and thereby electrically insulated from said outer electrode, said inner electrode having its ends inserted respectively into said tubular members and said tubular members being pinched to secure said inner electrode therein.

3. A radiation detector comprising an elongated tubular outer electrode, an elongated inner electrode, a closure for each end of said tubular electrode, an insulating assembly secured to each of said closures and spaced from said outer electrode, said insulating assemblies extending into the interior of said tubular electrode and at least one of said assemblies extending through its associated closure, a deformable tubular member secured to each of said insulating assemblies, that tubular member which is secured to said extended insulating assembly extending completely therethrough for communication with both the exterior and interior of said outer electrode, an end of said inner electrode being inserted in said last-mentioned tubular member and extending therethrough, the other end of said inner electrode being inserted in the other of said tubular members, and said ends being secured within said tubular members by pinching said tubular members, at least one of said tubular members being pinched exteriorly of said closure.

4. A radiation detector comprising an elongated tubular outer electrode, an elongated inner electrode, a closure for each end of said tubular electrode, an insulating assembly secured to each of said closures and spaced from said outer electrode, said insulating assemblies extending into the interior of said tubular electrode and at least one of said assemblies extending through its associated closure, a deformable tubular member secured to each of said insulating assemblies, that tubular member which is secured to said extended insulating assembly extending completely therethrough for communication with both the exterior and interior of said outer electrode, an end of said inner electrode being inserted in said extended tubular member and extending therethrough, said extended tubular member being formed from a conductive material, the other end of said inner electrode being inserted in the other of said tubular members, said ends being secured within said tubular members by pinching said tubular members, at least one of said tubular members being pinched exteriorly of said closure, a conductor secured to said extended tubular member for connecting said inner electrode to a source of electric potential, and means for connecting said outer electrode to a source of potential.

5. In a radiation detector, the combination comprising an elongated tubular metallic outer electrode and an elongated inner electrode, a metallic cup-shaped closure inserted bottom first into an end of said outer electrode, an annular weld joining and sealing the side wall of said cup-shaped member to the associated end of said outer electrode, closure means for closing the other end of said outer electrode, and insulated means for joining said inner electrode to said cup-shaped member and said closure means.

6. A radiation detector comprising an elongated tubular outer electrode, an elongated inner electrode, closure means for sealing one end of said tubular electrode, additional closure means for sealing the other end of said tubular electrode, said additional closure means comprising a pair of nested cup-shaped members inserted into said other end, means for sealing said cup-shaped members to said outer electrode, means for joining said inner electrode in insulating relationship to said first-mentioned closure means and to the innermost one of said cup-shaped members, the bottom wall portions of said cup-shaped members enclosing a space therebetween, said innermost cup-shaped member having a plurality of flow apertures communicating with the interior of said outer electrode and with said space, and means coupled to the outermost one of said cup-shaped members and communicating with said space for exhausting the interior of said tubular electrode.

7. A radiation detector comprising an elongated tubular outer electrode, an elongated inner electrode, closure means for sealing one end of said tubular electrode, additional closure means for sealing the other end of said tubular electrode, said additional closure means comprising a pair of nested cup-shaped members inserted bottom first into said other end, means for sealing said cup-shaped members to said outer electrode, said means including an annular weld joining and sealing the side walls of said nested cup members to said outer electrode, means for joining said inner electrode in insulating relationship to said first-mentioned closure means and to the innermost one of said cup-shaped members, the bottom wall portions of said cup-shaped members enclosing a space therebetween, said innermost cup-shaped member having a plurality of flow apertures communicating with the interior of said outer electrode and with said space, and means coupled to the outermost one of said cup-shaped members and communicating with said space for exhausting the interior of said tubular electrode.

8. A radiation detector comprising an elongated outer electrode and an elongated inner electrode, closure means sealed to one end of said outer electrode, second closure means sealed to the other end of said outer electrode, means for joining said inner electrode adjacent its ends respectively to said first and second closure means, said second closure means including a pair of nested cup-shaped members inserted into said other end of the outer electrode, the bottom portions of said members enclosing a space therebetween, the associated end of said inner electrode having been joined adjacent the center of the innermost one of said cup-shaped members, said innermost cup-shaped member having a plurality of flow apertures surrounding said junction and communicating with the interior of said tubular electrode and with said space, and means communicating with said space and secured to the outermost one of said cup-shaped members for exhausting the interior of said outer electrode.

9. A radiation detector comprising an elongated tubular metallic outer electrode and an elongated inner electrode, a metallic cup-shaped closure inserted bottom first into an end of said outer electrode, an annular weld joining and sealing the side wall of said cup-shaped member to the associated end of said outer electrode, closure means for closing the other end of said outer electrode, insulated means for joining said inner electrode to said cup-shaped member and said closure means, and means for exhausting the interior of said outer electrode, said means being associated with said cup-shaped member.

10. A radiation detector comprising an elongated conductive tubular member, a closure member inserted into each end of said tubular member, said closure members each having an aperture disposed adjacent its center, a pair of opposed flanged thimbles inserted respectively in said apertures, the flange of each said thimbles being disposed in bearing contact with a portion of the associated one of said closures, an elongated electrode, an insulating member supported by and sealed to each of said thimbles, means for securing said electrode to said insulating members at positions adjacent the ends respectively of said electrode, and means for sealing said thimbles to said closure member respectively and for sealing said closure members to said tubular member.

References Cited in the file of this patent

UNITED STATES PATENTS

| | | |
|---|---|---|
| 1,508,076 | Taylor | Sept. 9, 1924 |
| 2,426,650 | Sivian | Sept. 2, 1947 |
| 2,476,387 | Roovers | July 19, 1949 |
| 2,479,032 | Thibieroz | Aug. 16, 1949 |
| 2,494,641 | Anderson et al. | Jan. 17, 1950 |
| 2,522,902 | Shamos | Sept. 19, 1950 |
| 2,605,435 | Krasnow et al. | July 29, 1952 |
| 2,654,041 | McCurdy et al. | Sept. 29, 1953 |